Patented May 8, 1951

2,552,500

UNITED STATES PATENT OFFICE 2,552,500

ABRASIVE ARTICLES BONDED WITH A METHYL PENTADIENE SYNTHETIC ELASTOMER AND METHOD OF MANUFACTURING THE SAME

Carl von Doenhoff, Niagara Falls, N. Y., assignor to The Carborundum Company, Niagara Falls, N. Y., a corporation of Delaware No Drawing. Application August 14, 1946, Serial No. 690,592

5 Claims. (Cl. 51—298)

1

This invention relates to synthetic rubber bonded abrasive articles such as grinding wheels and sharpening stones in which the bond comprises as an essential ingredient a polymer of a methyl pentadiene or a copolymer thereof with another olefin or diolefin, and to methods of making such articles.

In the manufacture of bonded abrasive articles such as grinding wheels and sharpening stones, abrasive grains are mixed with a bonding material, the mixture is shaped to form the article as by rolling into a sheet or by pressing in a mold, and the bond is hardened. Many types of bonds are employed for the purpose of obtaining articles having grinding characteristics which suit them particularly for special purposes. Among the bonds which have been used are natural rubber and, more recently, various types of synthetic rubbers.

While such bonds have made it possible to produce articles which are satisfactory for numerous purposes, none of the synthetic elastomers has satisfactorily reproduced the properties obtainable with natural rubber. Furthermore, the characteristics of the synthetic elastomers in their unvulcanized state have been such that there has been a considerable problem in preparing the abrasive mix. Natural rubber can be made quite plastic and tacky by repeated rolling following which the abrasive grains can be introduced into the rubber mass to provide a sheeted mixture from which the abrasive articles can be cut. None of the synthetic elastomers heretofore used can be made both plastic and tacky like natural rubber by breaking down in rolls and it has therefore been necessary to modify the rubbers with plasticizers to bring about the necessary plasticity and tack before the abrasive grains can be satisfactorily incorporated in the rubber compound.

Another deficiency of the synthetic rubbers heretofore employed in the abrasive industry has been the poor water resistance of the abrasive article bonded with these materials when they are compounded with the additional ingredients needed to make a satisfactory abrasive article. Many rubber bonded abrasive articles are used for grinding in the presence of water and abrasives bonded with the more commonly used synthetic rubbers lose their strength and toughness under such conditions with the result that they have not been entirely satisfactory for many wet grinding applications.

When natural rubber is heated for a number of hours at temperatures of around 400° to 450° F.

2 the rubber changes character and eventually liquefies. Such liquefied or "decomposed" natural rubber has been used to some considerable extent both as the principal ingredient of bonds for abrasives and to provide a coating about the individual abrasive grains which are subsequently bonded with rubber. Attempts have been made to similarly liquefy the synthetic elastomers such as the copolymers of butadiene with styrene or acrylic nitrile but when such products are heated they do not liquefy like natural rubber. The lack of such liquefied or decomposed rubber during the scarcity of natural rubber has been a serious handicap to the abrasive industry.

It is accordingly an object of the present invention to provide improved abrasive articles and method of making such articles which will not have the deficiency and disadvantages heretofore found with the synthetic elastomers which have heretofore been available. Another object of the invention is to provide an improved synthetic rubber bonded abrasive article which will be satisfactory for wet grinding operations. Still another object of the invention is to provide a liquid degradation product of a synthetic rubber which is useful in the manufacture of bonded abrasive articles. Other objects of the invention will appear from the disclosure hereinafter made.

I have discovered that a synthetic elastomer made by polymerizing a methyl pentadiene such as 2-methyl-1,3-pentadiene or 4-methyl-1,3-pentadiene, or mixtures thereof, and that copolymers of the methyl pentadienes with other unsaturated compounds such as the vinyl compounds (including styrene and acrylic nitrile), and more particularly with the diolefins such as butadiene, or with both the vinyl compound and the diolefin, form very satisfactory bonds for abrasive articles such as grinding wheels or sharpening stones. I have also found that these polymers and copolymers will liquefy with the formation of degradation products when they are heated at a temperature of about 500° F. and that such degradation products are valuable in making such abrasive articles. Although either the 2-methyl or the 4-methyl pentadiene may be used alone or other proportions of mixtures thereof may be employed, I have found that elastomers made by polymerizing mixtures containing approximately 85% of 2-methyl and 15% of the 4-methyl-1,3-pentadienes are very satisfactory for use in my invention. Similarly, I have found that copolymers of various unsaturated compounds with the methyl pentadiene or mixtures may be used but one specific mixture which I have found to be satisfactory is the copolymer of 80% of the mixture of 85% 2-methyl with 15% methyl-1,3-pentadiene with 20% butadiene.

The synthetic elastomers of my invention may be prepared in a manner similar to that employed in making the synthetic elastomers heretofore known such as the copolymers of butadiene with styrene or with acrylic nitrile. The monomeric compounds are dispersed in water with the aid of suitable dispersing agents; polymerization may then be effected by heating in the presence of a catalyst, frequently under pressure. As a result of this treatment a dispersion of finely divided solid particles of the polymer or copolymer in water is obtained which, like the natural rubber product, is commonly referred to as a latex. The latices of the polymers and copolymers of my invention are relatively stable as compared to natural latex and may be used by methods commonly known to prepare abrasive mixes which may subsequently be dehydrated, shaped as by pressing in a mold, and vulcanized to harden the elastomer to obtain a bond having properties similar to that of hard vulcanized rubber.

Alternatively, the latex may be coagulated to obtain sheets similar to the smoked sheets or pale crepe rubber sheets of commerce. Such sheet material may then be made plastic by passing through rolls, the various compound ingredients including a vulcanizing agent and the abrasive grains may be admixed with the elastomer to form a sheet, and abrasive articles cut from such sheets may then be vulcanized, all according to methods common in the abrasive art. As stated above, when this method of preparation is employed the elastomers of my invention have a material advantage over the other synthetic elastomers heretofore used because they can be made relatively soft, plastic and tacky by rolling, much the same as natural rubber whereas the other elastomers heretofore used do not soften and become tacky by such treatment to anywhere near the extent of the natural rubber.

The following examples illustrate methods and compositions employed in carrying out my invention. It is to be understood that they merely represent specific embodiments of the invention and are not limitative.

*Example I*

200 parts of a copolymer of 20 parts by weight of butadiene with 80 parts by weight of a mixture containing 85% 2-methyl and 15% 4-methyl-1,3-pentadiene was broken down by passing through rolls to make it plastic. 40 parts of a liquid phenol formaldehyde condensation product sold by the Bakelite Corporation under the designation "BR-7534" was milled into the copolymer followed by 100 parts of sulfur and 300 parts of cryolite to prepare a bond composition. To this material was then gradually added 1360 parts of 54 grit fused alumina abrasive grain to obtain a sheet in which the grain was uniformly distributed through the bond composition. The mixture was sheeted to a thickness of $\frac{3}{32}$ inch and a cut-off wheel having an outer diameter of 16 inches and an arbor hole 1 inch in diameter was cut from the sheet. This wheel was cured by baking for 16 hours in an oven in which the temperature was 320° F. The wheel was employed for cutting off cold rolled steel and was found to be wholly satisfactory when used either with or without a coolant. It was superior to similar wheels made with other synthetic elastomers because it did not soften when used for the wet grinding as the other elastomers did.

*Example II*

A liquid degradation product of the copolymer of Example I was prepared by cutting 580 grams of the copolymer into small pieces and heating over a sand bath in a metal container. The temperature was brought up to approximately 500° F. in 1½ hours and was kept at about that temperature for 4 hours. At the end of the heating the product obtained was water-thin but when cooled to room temperature it thickened up to a viscous liquid.

The liquid from Example II was found to be vulcanizable and to form a hard bond satisfactory for forming molded abrasive articles. I also found it to be useful in preliminarily coating abrasive grains, particularly when mixed with a phenol formaldehyde condensation product, and for plasticizing various synthetic elastomers and natural rubber.

*Example III*

725 grams of a polymer of a mixture of 85% 2-methyl and 15% 4-methyl-1,3-pentadiene were cut up into small pieces and added gradually into one-gallon metal can on a sand bath on a gas flame. The temperature of the mass was brought up to approximately 500° F. in about 3 hours and was held at that temperature for an additional hour with occasional agitation during which time the mass in the container first melted and formed a viscous liquid and finally assumed a very light consistency. Upon cooling to room temperature the mass obtained was a viscous liquid quite similar to that of Example II.

The liquids of Examples II and III may be used as the principal constituent of the bond for making molded articles and may be vulcanized by employing about 50% sulfur based on the liquid. The liquid may be first mixed with abrasive grain and then an inert filler such as anhydrous calcium sulfate and a pulverized phenol formaldehyde resin in the "A" stage may be mixed with the wetted grain to provide a moldable mixture. This mixture may be put into a mold and hot pressed. The thus formed article can be removed from the mold and cured by heating at about 300° F. in an oven.

Alternatively, the liquid degradation products may be used to modify the properties of natural or synthetic rubbers by milling into the mass of rubber followed by incorporation of compounding agents and abrasive grain according to practices well known in the abrasive art.

The products made with the synthetic rubbers of my invention have satifactorily high tensile strengths. They are much more satisfactory for processing because they develop plasticity and tack when milled in a manner similar to natural rubber. Furthermore, the bonds of my invention have less nerve when hot than other synthetic rubbers, which results in denser structures in the completed abrasive articles. As stated before, they are more water-resistant than the butadiene-styrene copolymers and are thus adapted for use in wet grinding operations.

The liquefied degradation products of these polymers and copolymers present a number of advantages over similar products made from natural rubber. They are more viscous when they are cold and more fluid when they are hot than decomposed natural rubber. This results in a better flow of the bond during the hot molding step and correspondingly more uniform structure. On the other hand, when the hot molded article has been cooled the increased viscosity of the cold products results in an article which may be handled much more satisfactorily than similar products made from decomposed crude rubber.

The polymers and copolymers of the methyl pentadienes are obtainable in different degrees of polymerization. By stopping polymerization at a fairly early stage it is possible to provide synthetics and elastomers which are relatively soft and pliable whereas polymerization to a higher degree results in products which are harder and tougher. One way of determining the extent of polymerization is by measuring the plasticity of the unvulcanized elastomers in a so-called "plastometer." The method, briefly stated, consists in preparing spheres of the elastomer, heating them as for example for about 20 minutes at about 160° F., placing them on one of a pair of parallel plates and placing the other plate on top of the sphere, applying a load to the upper plate and measuring the distance between the plates after the load has been applied for a predetermined time such as for about 3 minutes. A test of the elastomers described in Examples I and III above wherein spheres were made from 1.7 grams of the elastomers and a load of 4065 grams was applied for a period of 3 minutes after the spheres had been heated for 22 minutes at 158° F. resulted in a plasticity measurement of .169 inch for the copolymer of Example I and .145 inch for the homopolymer of Example II.

An additional measurement made in such test is the recovery of the elastomer measured 5 minutes after the load has been removed. The recovery of the two samples just described was to thicknesses of .378 inch and .231 inch respectively. A similar test made on a standard copolymer of butadiene with styrene sold as "GRS" (meaning government rubber-styrene copolymer) showed a plasticity of .153 inch and a recovery to .359 inch.

In describing my invention I have referred to the products obtained by polymerizing a mixture of the 2-methyl and the 4-methyl pentadienes as a "polymer" and I have also referred to the products obtained by polymerizing butadiene with a mixture of 2-methyl and 4-methyl pentadiene as a "copolymer." In the claims it is to be understood that the term "polymer" includes both a polymer of either the 2-methyl or the 4-methyl pentadiene alone or a polymer of a mixture of those two isomers, and similarly, the term "binary copolymer of a methyl pentadiene with butadiene" is to include copolymers of butadiene with either of the pentadienes alone or with a mixture of the two isomers.

I have described my invention in some detail and have provided a number of specific examples. However, I do not intend to restrict the scope of the present invention to such specified examples, since it may also be practiced by use of the compositions herein described in conjunction with other bonding materials, as for example, natural rubber, reclaimed rubber, other synthetic rubbers, or other synthetic resinous materials. Other modifications of the invention commonly used in the abrasive art may be employed without departing from the spirit of the invention, the scope of which is defined in the appended claims.

I claim:

1. An abrasive article comprising abrasive grains and a bond therefor comprising essentially a hard-vulcanized synthetic elastomer selected from the group consisting of polymers of a methyl pentadiene and binary copolymers of a major proportion of a methyl pentadiene and a minor proportion of butadiene.

2. An article as claimed in claim 1 wherein the bond also contains a heat-hardened phenol-formaldehyde condensation product.

3. An abrasive article comprising abrasive grains and a bond therefor comprising essentially a hard-vulcanized liquid heat-degradation product of a synthetic elastomer selected from the group consisting of polymers of a methyl pentadiene and binary copolymers of a major proportion of a methyl pentadiene and a minor proportion of butadiene.

4. An article as claimed in claim 3 wherein the bond also comprises a heat-hardened phenol-formaldehyde condensation product.

5. An article as claimed in claim 3 wherein the bond also contains a hard-vulcanized elastomer selected from the group consisting of natural and synthetic rubbers.

CARL VON DOENHOFF.

REFERENCES CITED

The following references are of record in the file of this patent:

UNITED STATES PATENTS

| Number | Name | Date |
|---|---|---|
| 2,114,636 | Nelson | Apr. 19, 1938 |
| 2,229,880 | Allison | Jan. 28, 1941 |
| 2,381,267 | Drake | Aug. 7, 1945 |
| 2,391,817 | Blackburn | Dec. 25, 1945 |

OTHER REFERENCES

"Modern Synthetic Rubbers," H. Barron, 1944, 2nd ed., published by Van Nostrand Co., pages 204 and 205.

"New Synthetic Rubbers Based on Methyl Pentadiene," McMillan et al., India Rubber World, Feb. 1, 1946, pages 663-666 and 669.